(12) United States Patent
Eshleman

(10) Patent No.: US 7,505,081 B2
(45) Date of Patent: Mar. 17, 2009

(54) SYSTEM AND METHOD FOR PRESERVING EXTERNAL STORAGE DEVICE CONTROL WHILE IN PICTURE-OUTSIDE-PICTURE (POP) OR PICTURE-IN-PICTURE (PIP) MODES

(75) Inventor: Matthew A. Eshleman, Mt. Joliet, TN (US)

(73) Assignee: Toshiba America Consumer Products, L.L.C., Wayne, NJ (US)

( * ) Notice: Subject to any disclaimer, the term of this patent is extended or adjusted under 35 U.S.C. 154(b) by 431 days.

(21) Appl. No.: 11/130,392

(22) Filed: May 17, 2005

(65) Prior Publication Data

US 2005/0264698 A1    Dec. 1, 2005

Related U.S. Application Data

(60) Provisional application No. 60/571,528, filed on May 17, 2004, provisional application No. 60/571,529, filed on May 17, 2004, provisional application No. 60/571,527, filed on May 17, 2004.

(51) Int. Cl.
*H04N 5/45* (2006.01)
*H04N 9/74* (2006.01)

(52) U.S. Cl. .................. 348/565; 348/567; 348/584; 348/598

(58) Field of Classification Search .......... 348/563–565, 348/567–568, 584, 588–589, 734, 553–555, 348/705–706; 725/131, 139, 37, 151; *H04N 5/45*, *H04N 9/74*
See application file for complete search history.

(56) References Cited

U.S. PATENT DOCUMENTS

| 6,263,503 | B1 * | 7/2001 | Margulis ..................... 725/81 |
| 7,034,891 | B2 * | 4/2006 | Joung et al. ................. 348/565 |
| 7,151,575 | B1 * | 12/2006 | Landry et al. ............... 348/723 |
| 7,242,316 | B2 * | 7/2007 | Scheelke ................ 340/825.24 |
| 7,271,847 | B2 * | 9/2007 | Dumont et al. ............. 348/565 |

* cited by examiner

*Primary Examiner*—Trang U Tran
(74) *Attorney, Agent, or Firm*—Nixon & Vanderhye PC

(57) ABSTRACT

A system and method permits time-shifting or recording for any tuner input, regardless of whether the tuner input is being used for POP (or PIP) or main viewing window. This allows POP (or PIP) video modes and recording to an external recording device to be carried out simultaneously. In one example system and method, a switch is controlled in accordance with a control program of the television to dynamically select which inputs are routed to the main and sub viewing windows.

3 Claims, 3 Drawing Sheets

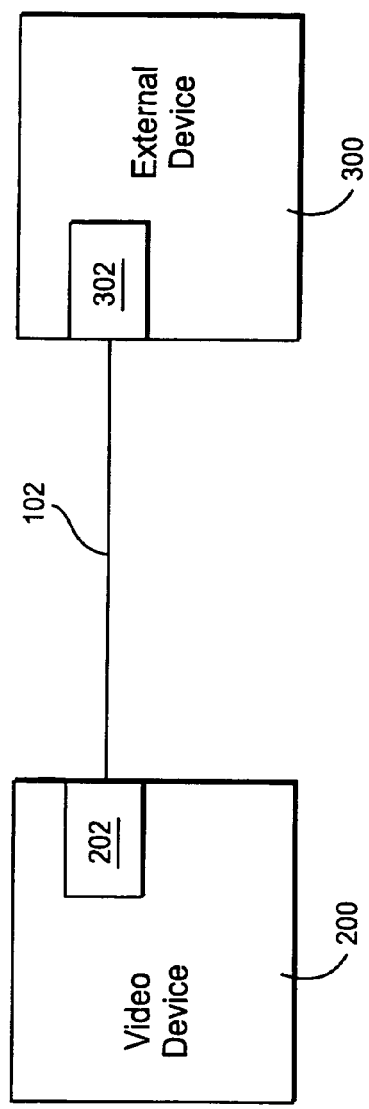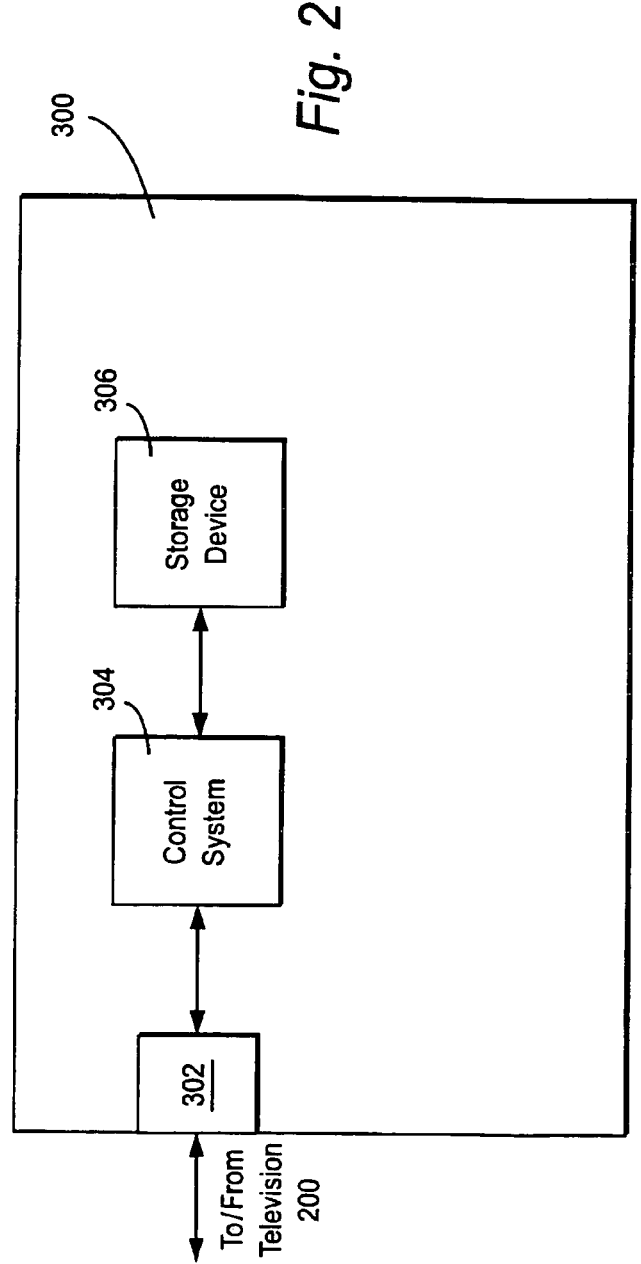

SYSTEM AND METHOD FOR PRESERVING EXTERNAL STORAGE DEVICE CONTROL WHILE IN PICTURE-OUTSIDE-PICTURE (POP) OR PICTURE-IN-PICTURE (PIP) MODES

CROSS REFERENCE TO RELATED APPLICATIONS

This application claims the benefit of U.S. Provisional Application No. 60/571,528 filed on May 17, 2004 and of U.S. Provisional Application No. 60/571,529, filed on May 17, 2004. The contents of each of these applications are incorporated herein in their entirety.

This application is related by subject matter to application Ser. No. 11/130,397, filed May 17, 2005, which claims the benefit of U.S. Provisional Application No. 60/571,527, filed May 17, 2004. The contents of each of these applications are incorporated herein in their entirety.

BACKGROUND AND SUMMARY

The subject application relates to a system and method in which output from a television to a recording device can be maintained when certain operating modes of the television including, but not limited to, picture-in-picture (PIP) and picture-outside-picture (POP) are used.

Many televisions provide so-called picture-in-picture (PIP) and/or picture-outside-picture (POP) modes. PIP refers to a feature that allows a user to view a second channel (sometimes referred to as a PIP or "sub" channel) in a window 20 embedded in a display 30 of a first channel (sometimes referred to as a "main" channel) as shown in FIG. 5A. The television often includes controls for moving and re-sizing the window 20. With reference to FIG. 5B, POP refers to a feature in which the television screen is divided into two, generally equal-sized, main and sub windows 40 and 50, respectively, and main and sub channels are displayed in the windows. The PIP and POP features permit users to watch programming on two different channels at the same time and have proven to be popular with consumers. Generally speaking, these features are implemented by providing the television with two tuners, one of which is tuned to the main channel and the other of which is tuned to the sub-channel.

It is desirable to maintain a user's ability to utilize features such as PIP and POP even as new features and capabilities are added to televisions. For example, recording devices such as hard disk (HD) recorders, DVD recorders and HD/DVD recorders are becoming more popular. However, in many televisions, POP and PIP cannot be used while an external recording device is time-shifting or recording a program.

The system and method described herein permits time-shifting or recording for any tuner input, regardless of whether the tuner input is being used for POP (or PIP) or the main viewing window. This allows POP (or PIP) video modes and recording to an external recording device to be carried out simultaneously. In one example system and method, a switch is controlled in accordance with a control program of a television to dynamically select which inputs are routed to the main and sub viewing windows.

These and other features and advantages will be better and more completely understood by referring to the following detailed description of example embodiments in conjunction with the drawings.

BRIEF DESCRIPTION OF THE DRAWINGS

FIG. 1 is a block diagram showing a video device connected to an external device.

FIG. 2 is a block diagram of an external storage device which is an example of external device 300 shown in FIG. 1.

DETAILED DESCRIPTION OF EXAMPLE EMBODIMENTS

Figures 3, 4:
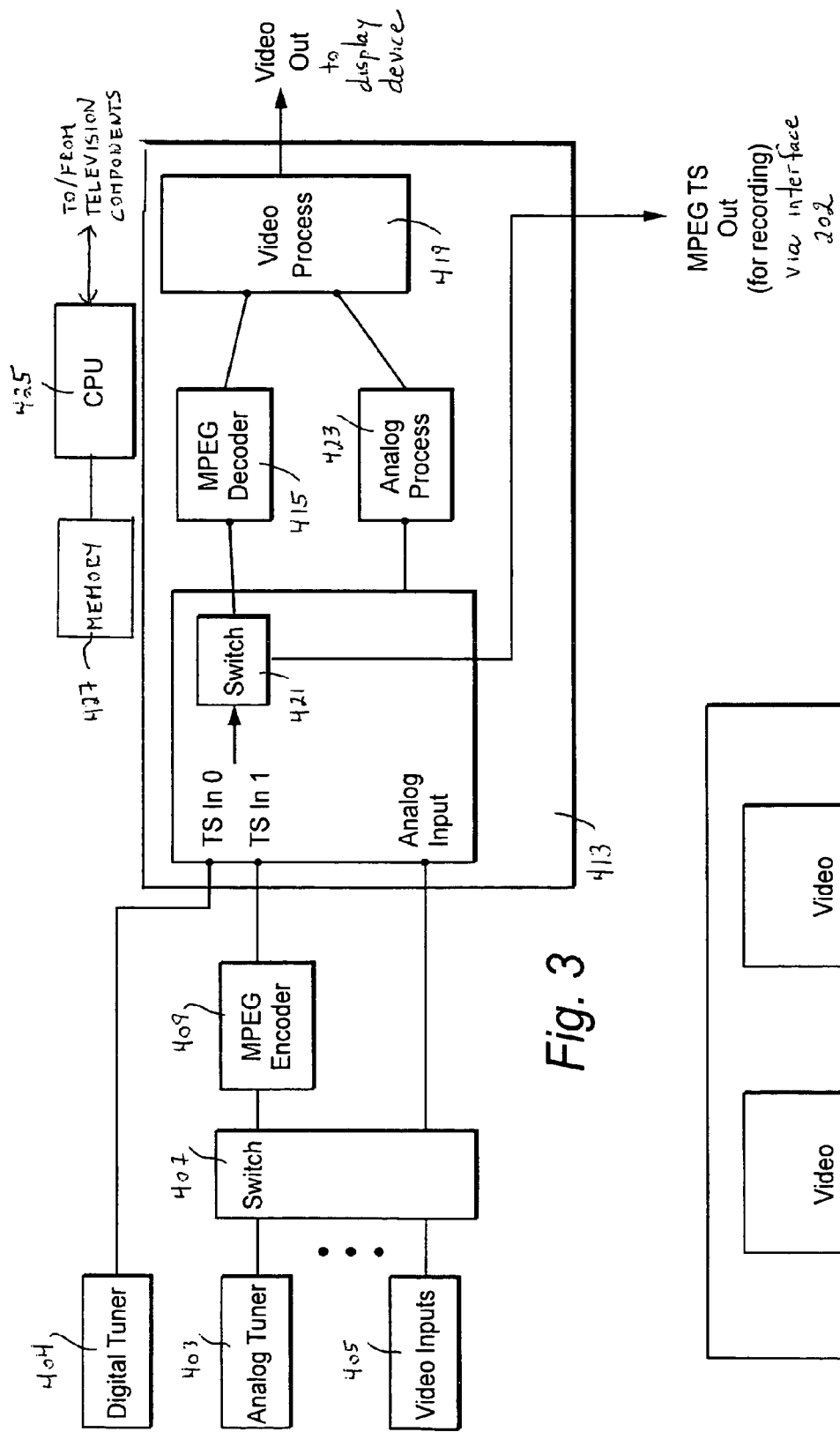
FIG. 3 is a block diagram of a portion of an example television for use in explaining how video inputs may be switched to preserve recording capability in PIP/POP modes.
FIG. 4 shows an example POP display in which the "main" window is always true analog video and the "sub" window is always MPEG encoded analog source video.
Figure 5A:
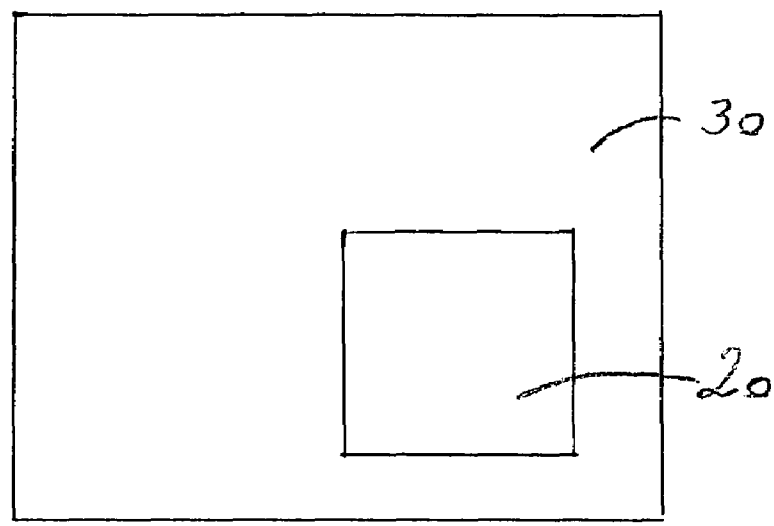
FIGS. 5A and 5B show examples of PIP and POP displays, respectively.
Figure 5B:
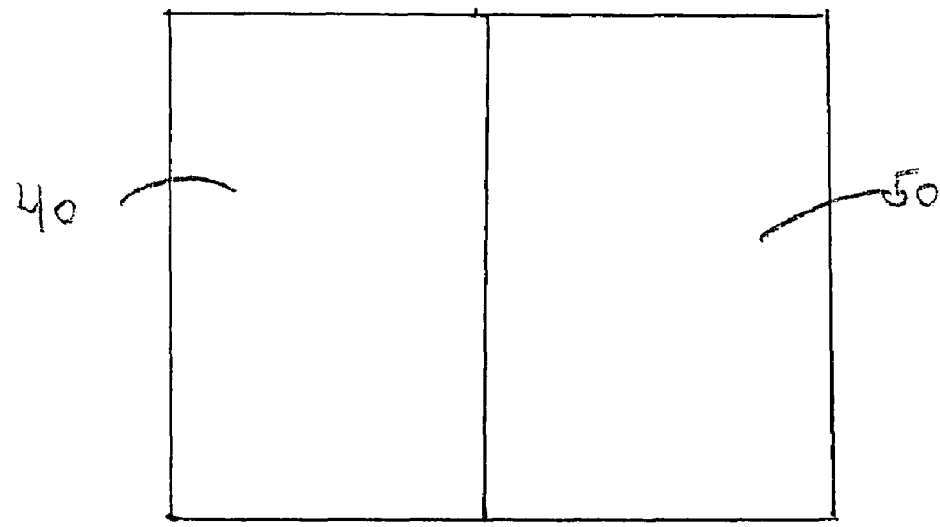

FIG. 1 is a block diagram showing an external device 300 having an externally accessible interface 302 connected by a cable 102 to an externally accessible interface 202 of a video device 200. In an example embodiment described below, video device 200 is a television and external device 300 comprises a storage device (such as a hard disk) for storing audio-visual (AV) data. AV data as used herein includes not only audio and visual data, but also standard MPEG program specific information (PSI) that provides information about the data stream such as type of video, type of audio, conditional access information, content advisory information, closed-caption information and the like. External storage device 300 also separately stores "track" information, which includes program title information, program duration information, and other descriptive information that can be used by the television, for example, to generate display screens to assist users in selecting programs for playback from the external storage device.

In other implementations, the external storage device 300 can store music data (such as MP3 files), image data (such as JPEG or TIFF files) and other standard personal computer files. Of course, if such data were stored, the television would provide a suitable user interface for storing and accessing the stored data for playback, display or other processing (e.g., e-mailing to others). Video device 200 is not limited to a television and may be a set-top box, a monitor and the like. Similarly, external devices other than storage devices may be used, such as DVD players, VCRs and the like. In the example embodiment, when connected to the television, external storage device 300 permits a user to use a variety of functions, including so-called personal video recording (PVR) functions for the recording and playback of AV data.

Although interface 202 is shown in FIG. 1 as being of the type for wired communications, interface 202 may be of any type suitable for wired or wireless communications of AV data and related commands between the television and the external storage device. Such interfaces include by way of example, not limitation, IEEE 1394, USB, 802.11g, and UWB (ultra-wideband) connections. In addition, the interface may include separate paths for different types of data. Thus, for example, AV data may be communicated over one connection (e.g., an IEEE 1394 connection) and commands may be communicated over another separate connection (e.g., a Bluetooth® connection). Bluetooth is a registered trademark of Bluetooth SIG, Inc.

FIG. 2 is a block diagram of an external storage device which is an example of external device 300 shown in FIG. 1. The external storage device will hereinafter be referred to as external storage device 300. External storage device 300 includes an interface 302 for communications with television 200 over cable 102. As with interface 202, interface 302 may be a wired or wireless interface as appropriate. A control system 304 controls the external storage system 300. Control system 304 may be implemented, for example, as a microprocessor, an application specific integrated circuit (ASIC), logic circuitry, a state machine and/or combinations thereof. Control system 304 is responsive to commands from the television received via interface 302 for effecting operations involving AV data on a storage device 306. For example, a first such operation stores AV data on a storage device 306 and a second such operation reads stored AV data from storage device 306 for playback on television 200. In the example embodiment, storage device 306 includes one or more hard disks, but is not limited thereto and may comprise any magnetic, optical, or semiconductor memory, as well as combinations thereof. The hard drive may have a capacity of, for example, 80 GB, 120 GB or larger. External storage system 300 also includes a power supply (not shown) for supplying power to control system 304 and storage device 306. The power supply may be powered via a connection to an ordinary electrical outlet or by one or more batteries.

As noted above, external storage device 300 may be connected to television 200 in order to provide PVR functions for a user. These PVR functions allow users to store and playback AV data. The user uses a remote control to enter various commands relating to the PVR functions. These commands are input to the remote control and are transmitted by a transmitter (e.g., an infrared transmitter) of the remote control to a remote control interface of television 200. The commands are then sent from the interface to a control system (e.g., CPU) of the television. The control system decodes the received command and takes appropriate action(s) in response thereto which may include generating, encoding and sending commands to external storage device 300 via interface 202.

Control system 304 of the external storage device 300 takes appropriate action(s) in response to commands received from television 200. These actions include storing AV data received from television 200 into storage device 306, playing back AV data stored on storage device 306, providing status information (e.g., the free space/used space of storage device 306), deleting programs/streams/tracks, setting up "looping record buffers", storing track information (titles, durations, timestamps, etc) and the like.

In the example embodiment described herein, the television 200 contains software, firmware and/or hardware that enables a user to perform at least the following functions or operations:

PAUSE live television;
RECORD programs to the external storage device;
register the external storage device with an electronic program guide to permit automatic recording via program guide selections;
view programming recorded on the external storage device;
provide various graphical user interfaces (GUIs) to control SEARCH, (FAST) REWIND, FAST-FORWARD, PAUSE, SLOW-MOTION and PLAY;
provide various GUIs to allow selection of a program on the external storage device; and
provide various GUIs to control "live television" such as rewinding and fast-forwarding.

By way of example, the PLAY function begins playback of AV data stored on external storage device 300. The SEARCH function is used to locate a particular portion of the stored AV data and playback will then begin at that point. Using the SEARCH function, for example, a user can skip forward or backward during playback. In one example implementation, the user can configure the amount of time (e.g., 1, 3, 5 or 15 minutes) the device will skip each time the SEARCH function is invoked (e.g., by pressing the forward and backward SKIP/SEARCH keys on a remote control). The FAST FORWARD and FAST REWIND functions permit movement forward and backward through the AV data. FAST FORWARD and FAST REWIND may be performed at a variety of speeds (e.g., 5 times normal speed, 10 times normal speed, etc.) and at least some of these speeds may be configured by the user. Thus, the television may provide various display screens that prompt the user to select one or more speeds. The selected speeds are then stored in memory of television 200 and are referred to by the control system of the television when FAST FORWARD and/or FAST REWIND are used. The SLOW-MOTION function permits viewing of AV data in slow motion at a variety of different speeds ranging from, for example, ⅛ normal speed to single-frame advance. At least some of the slow-motion speeds may be user configurable. The PAUSE function permits forwarding and rewinding to be stopped and freezes play at the nearest I-frame. In an example embodiment, a screen saver may be displayed if the AV data is paused for longer than a predetermined period of time (e.g., two minutes). The RECORD function permits recording of an AV stream onto external storage device 300. The STOP function stops the flow of data to or from external recording device 300. There may also be functions for storing descriptive information with each program (title, duration, timestamp and the like).

The looping record buffer mentioned above is a buffer that is created on the external storage device that loops around automatically when the buffer is full, and then overwrites the older material in the buffer. This is a convenient type of recording buffer to use for pausing live television. In the example embodiment, the system dynamically destroys, creates and re-sizes the buffer with every channel change. The buffer size may, for example, be set so that approximately sixty minutes of AV data will be stored and thus the buffer size will vary depending on the bit rate of the current channel.

The example embodiment described herein permits time-shifting for any tuner input, regardless of whether the tuner input is being used for "POP" (Picture-Outside-Picture) or "PIP" (Picture-in-Picture) or for the main viewing window. This allows the simultaneous usage of the "POP" or "PIP" video modes and recording (or time-shifting) of audiovisual (AV) data to external storage device 300. In a simple configuration, a user would be disadvantageously denied access to POP or PIP modes while external storage device 300 is in use. As discussed below, the example embodiment is somewhat more complicated, but provides the user with more access to the features of the television. A graphic highlight to provide an indication to the user as to which POP window has focus may be provided as described in Provisional Application No. 60/571,529, the contents of which are incorporated herein.

An MPEG digital television may not have multiple analog video processing units. However, with reference to FIG. 3, such a television does have an analog-to-MPEG compressed video converter (encoder) 409, which allows this NPEG subsystem to be used for multiple purposes such as POP (encoded analog and live analog) video viewing and sending analog source video to the external storage device for recording MPEG transport streams.

With reference to FIG. 3, the example embodiment uses:

multiple MPEG transport stream inputs to video processor 413 which performs video processing such as MPEG decoding, analog processing, and other video processing such as generating on-screen displays of video and other information such as program guide data, POP and PIP displays and the like;

analog NTSC tuner 403 for tuning analog channels;

digital ATSC tuner 404 for tuning digital channels;

other video inputs 405;

single analog input to analog process 423 of video processor 413;

analog video switch 407 (multiple in, two out);

MPEG encoder 409;

MPEG decoder 415;

video processing system 419;

MPEG transport stream out (to external storage device for recording via interface 202);

switch 421 for selecting one of the transport streams supplied thereto;

CPU 425 which controls overall operation including operation of tuners 403, 404 and switch 407;

memory 427 (which may be volatile, non-volatile or a combination thereof for storing), by way of example, the control program of television and data such as program guide data and user preferences;

video display (not shown) connected to output of video processor 413.

In the disadvantageous simple implementation, a hard-wired approach to video POP display is used. FIG. 4 shows an example in which the "main" channel is always true analog and the "sub" channel is always MPEG encoded analog source video. However, this approach would prevent combinations of features, such as external storage device time-shifting or recording of analog tuner-sourced video.

Thus, in the example embodiment, the "main" and "sub" video types are dynamically selected in accordance, for example, with the control program of the television, as shown in Table I below to ensure that both POP and analog MPEG encoded video recording may take place simultaneously.

TABLE I

| MAIN | SUB |
|---|---|
| ANT NTSC → MPEG encoder | Video → analog capture |
| ANT ATSC → MPEG | Video → analog capture |
| Video → analog capture | ANT NTSC → MPEG encoder |
| Video → analog capture | ANT ATSC → MPEG |

The analog video switch(es) 407 shown in FIG. 3 are located inside the housing of the television and control routing of video to the various inputs and sub-systems. Thus, NTSC analog video can be routed directly to an internal "analog" compatible video processing input or it can be routed to the MPEG encoder 409 and its output goes to one of a plurality (e.g., three) "digital" compatible video processing inputs.

For best video quality, the "analog" processing input is preferred for an analog source. However, in a system with only a single analog video processing input, POP/PIP cannot be performed between two analog sources. Therefore, a "simple" approach would be to always route the current analog program to the higher quality analog input and then maintain that connection going into and out of POP.

However, when video is time-shifted, analog video is already routed to both the MPEG encoder path, and the direct analog input. When watching full screen video, the high quality analog input is shown (when live only), but in POP, the MPEG encoder path is used for display/processing the analog source video, thereby preserving the MPEG encoder operations on the existing channel and keeping the looping record buffer content intact. This requires more software, but provides greater use of the television functions.

While the example embodiment has been described above in connection with a television, the switching technique may also be implemented in a set-top box.

While the above discussion has been with reference to example embodiments, it is to be understood that variations of the example embodiments will be readily apparent and this application is intended to cover various modifications and equivalent arrangements included within the spirit and scope of the appended claims.

I claim:

1. A television connectable to an external storage device, the television comprising:

a video processor including an analog input to an analog processing operation thereof and a digital input to a digital processing operation thereof;

an MPEG encoder including an output connected to the digital input of the video processor;

a switch supplied with a plurality of analog input signals;

an interface supplied with an output of the MPEG encoder and connected, in use, to an external recording device;

a control section for controlling the switch to selectively supply one or more of the analog input signals to the MPEG encoder and the analog input of the video processor.

2. The television according to claim 1, wherein the control section controls the switch in a full-screen viewing mode to supply a first analog input signal to the analog input of the video processor for full-screen display and to the MPEG encoder for output to the external recording device via the interface and in a picture-in-picture or a picture-outside-picture mode to supply the first analog input signal to the MPEG encoder for main window display and for output to the external recording device via the interface and a second analog input to the analog input of the video processor for sub-window display.

3. The television according to claim 1, wherein the video processor further includes:

one or more additional digital inputs; and a switch for selecting a digital input signal supplied to the digital input or to the one or more additional digital inputs.

* * * * *